United States Patent
Chen

(10) Patent No.: US 10,564,435 B2
(45) Date of Patent: Feb. 18, 2020

(54) OPTICAL LENS, LIGHT GUIDE MEMBER AND DOUBLE SIDED LUMINOSITY DEVICE

(71) Applicant: CHAMP TECH OPTICAL (FOSHAN) CORPORATION, Foshan (CN)

(72) Inventor: Chin-Chung Chen, New Taipei (TW)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 98 days.

(21) Appl. No.: 15/919,291

(22) Filed: Mar. 13, 2018

(65) Prior Publication Data
US 2019/0243146 A1 Aug. 8, 2019

(30) Foreign Application Priority Data
Feb. 2, 2018 (CN) .......................... 2018 1 0106830

(51) Int. Cl.
*G02B 27/09* (2006.01)
*H05B 33/08* (2020.01)
(Continued)

(52) U.S. Cl.
CPC ......... *G02B 27/0955* (2013.01); *G02B 6/003* (2013.01); *G02B 6/0016* (2013.01);
(Continued)

(58) Field of Classification Search
CPC ............ G02B 27/0955; G02B 19/0028; G02B 6/0016; G02B 6/003; G02B 27/09; F21V 13/04
See application file for complete search history.

(56) References Cited

U.S. PATENT DOCUMENTS 6,356,395 B1 *  3/2002  Tawa ................... G02B 3/0056
                                                         359/641
8,059,692 B2 * 11/2011  Nomura ................ H01S 5/0425
                                                         372/92
(Continued)

FOREIGN PATENT DOCUMENTS

CN       203309785 U     11/2013
KR       101291477 B1 *   7/2013   ....... G02F 1/133606
(Continued)

OTHER PUBLICATIONS

Machine Translation of KR 101291477 B1. Translation created Aug. 14, 2019. (Year: 2019).*

*Primary Examiner* — Jong-Suk (James) Lee
*Assistant Examiner* — Christopher E Dunay
(74) *Attorney, Agent, or Firm* — ScienBiziP, P.C.

(57) ABSTRACT

A device emitting light from two sides includes a base, a first light emitting surface, and a second light emitting surface. The base comprises a first surface and a second surface, the first surface is depressed to form a receiving groove, the receiving groove comprising a light incidence surface. The first light emitting surface protrudes from the second surface. The second light emitting surface is arranged beside the receiving groove. The second light emitting surface is a micro-structural portion, the micro-structural portion recessed from the first surface towards the second surface and forming a plurality of micro-structures.

20 Claims, 8 Drawing Sheets

(51) Int. Cl.
*F21V 8/00* (2006.01)
*G02B 19/00* (2006.01)
(52) U.S. Cl.
CPC ......... *G02B 6/0018* (2013.01); *G02B 6/0021* (2013.01); *G02B 19/0061* (2013.01); *H05B 33/0806* (2013.01); *G02B 6/0036* (2013.01)

(56) References Cited

U.S. PATENT DOCUMENTS

| | | | |
|---|---|---|---|
| 9,929,110 B1* | 3/2018 | Male | H01L 23/66 |
| 2008/0239722 A1* | 10/2008 | Wilcox | F21V 5/04 |
| | | | 362/268 |
| 2011/0235338 A1* | 9/2011 | Chen | F21V 5/04 |
| | | | 362/311.02 |
| 2014/0003059 A1* | 1/2014 | Wang | F21V 13/04 |
| | | | 362/308 |
| 2014/0209931 A1 | 7/2014 | Liao | |
| 2016/0201875 A1* | 7/2016 | Kang | G02B 19/0014 |
| | | | 362/311.06 |
| 2017/0074482 A1* | 3/2017 | Lin | F21V 5/04 |
| 2018/0051863 A1* | 2/2018 | Lee | G02B 19/0061 |
| 2019/0155009 A1* | 5/2019 | Ha | G02B 19/0071 |

FOREIGN PATENT DOCUMENTS

| | | |
|---|---|---|
| TW | 201111702 A1 | 4/2011 |
| TW | M452346 U1 | 5/2013 |
| TW | 201431042 A | 8/2014 |
| TW | 201700910 A | 1/2017 |

* cited by examiner

OPTICAL LENS, LIGHT GUIDE MEMBER AND DOUBLE SIDED LUMINOSITY DEVICE

FIELD

The subject matter herein generally relates to optical field, and especially, to an optical lens, a light guide member, and a double sided luminosity device.

BACKGROUND

LED is a point light source, it is generally necessary to set a secondary optical lens to concentrate and guide light toward its output direction, and the secondary optical lens is designed to obtain a better light distribution curve according to an emitting angle of LED with different power.

However, the secondary optical lens in the prior art can only guide light in one direction, which limits the application of LED.

Therefore, it is desirable to provide an optical lens which can overcome the above-mentioned disadvantages.

BRIEF DESCRIPTION OF THE DRAWINGS

Implementations of the present technology will now be described, by way of example only, with reference to the attached figures.

DETAILED DESCRIPTION

Figure 1:
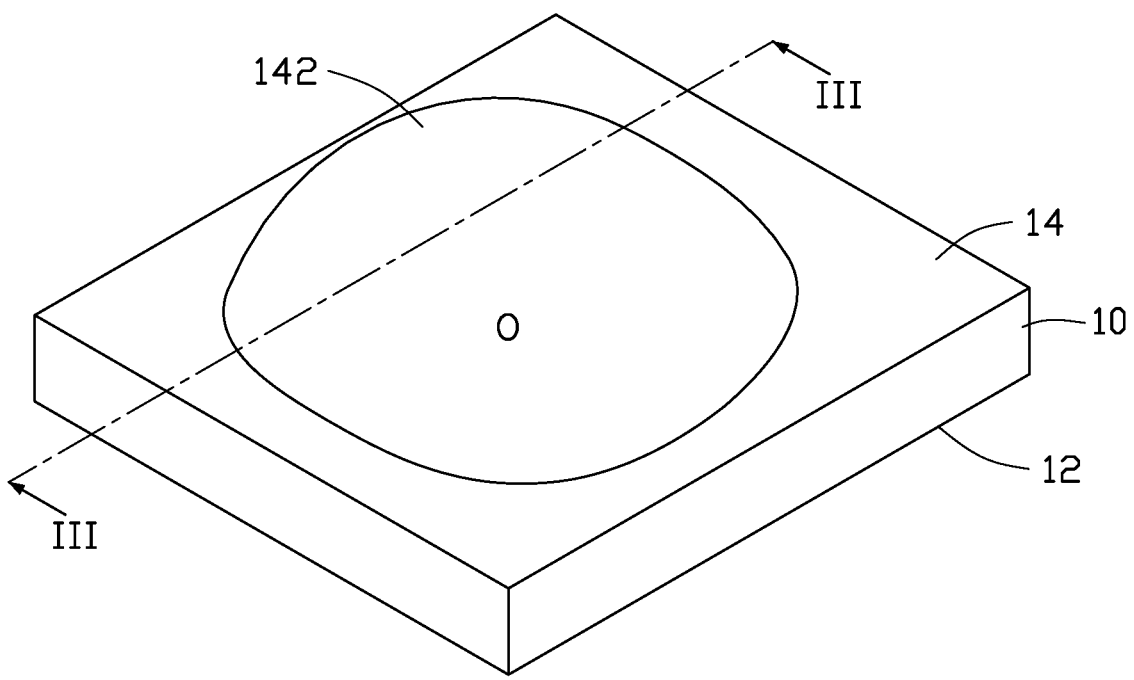
FIG. 1 is an isometric view of an optical lens in accordance with one exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Example 1

FIG. 1 illustrates an optical lens 1 according to one embodiment. The optical lens 1 is made from a plastic material with high light transmittance, such as PMMA (polymethyl methacrylate), or PC (polycarbonate), polyimide (PI), or polyethylene terephthalate (PET), which can achieve the intensity of lighting requirements, but also effectively improve the efficiency of light emission and reduce light loss.

The optical lens 1 includes a base 10, a first light emitting surface 142, and a second light emitting surface 124.

In this embodiment, the base 10 is substantially rectangular and includes a first surface 12 and a second surface 14 opposite to the first surface 12. The first surface 12 is rectangular and includes a center point O. An X axis, a Y axis, and a Z axis are defined relative to the first surface 12, and the X axis is perpendicular to the Y axis. The X and Y axes intersect at the center point O. The X axis is parallel to the first direction of the first surface 12 and the Y axis is parallel to the second direction of the first surface 12, the Z axis passes through the center point O and is perpendicular to the first surface 12. The direction from the center point O point to the arrow is the positive direction of the X axis, and the direction away from the arrow is the negative direction of the X axis.

Figure 4:
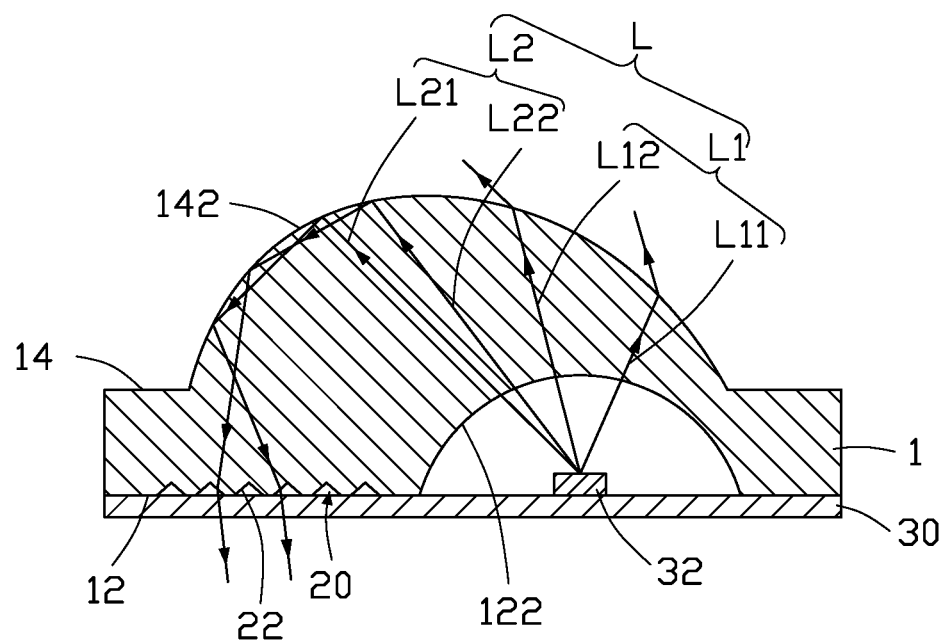
FIG. 4 is a cross-sectional view of a double-sided luminous device comprising the optical lens and a circuit board.
Figure 5:
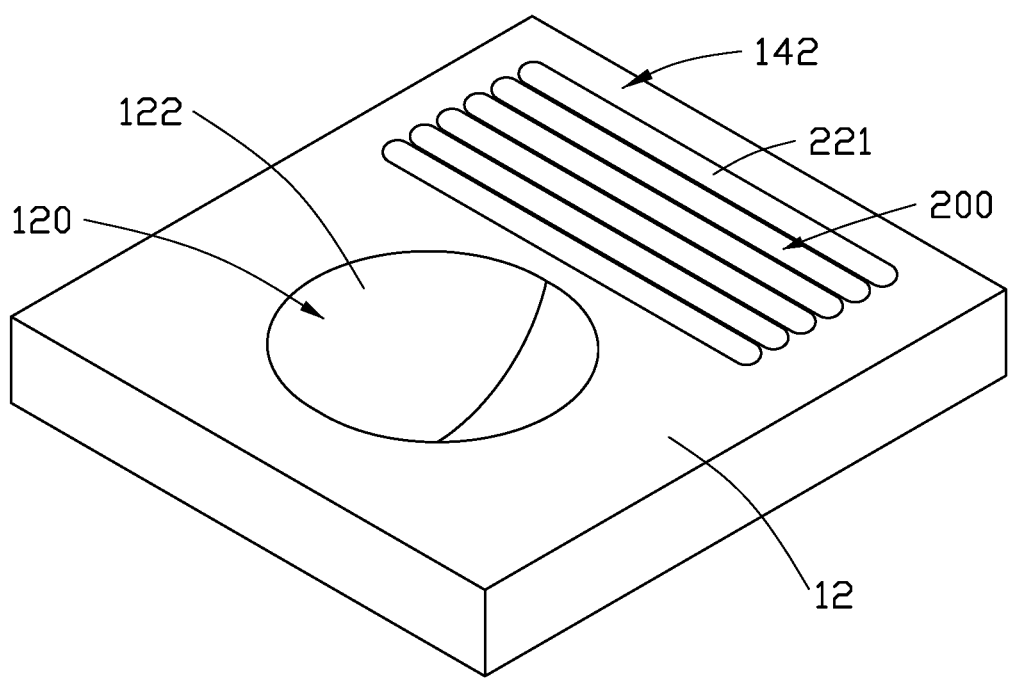
FIG. 5 is an isometric view of an optical lens in accordance with one exemplary embodiment.
Figure 6A:
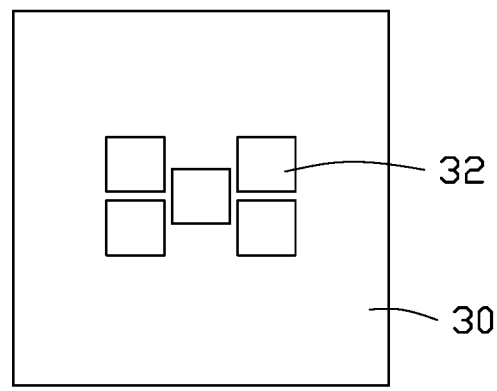
FIGS. 6A-6E provide several arrangements of light emitting diodes on a circuit board.
Figure 6B:
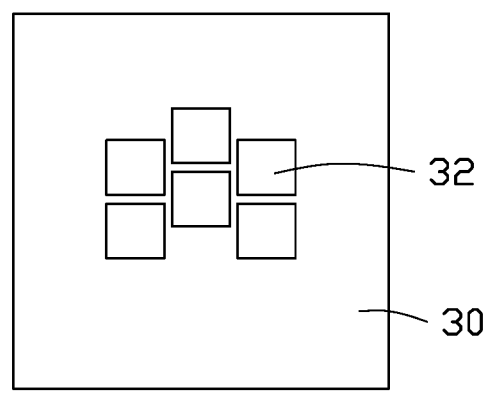
Figure 6C:
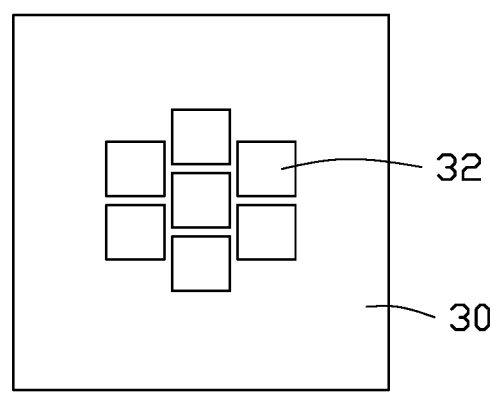
Figure 6D:
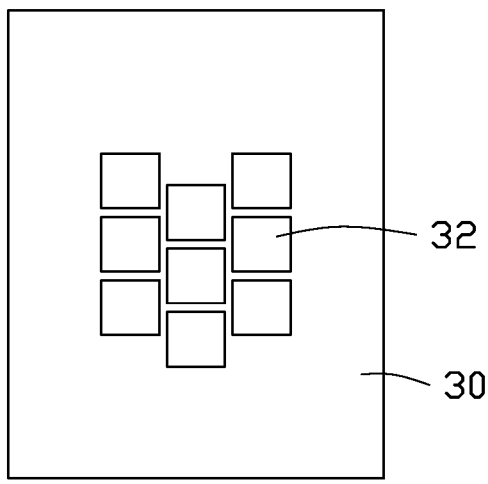
Figure 6E:
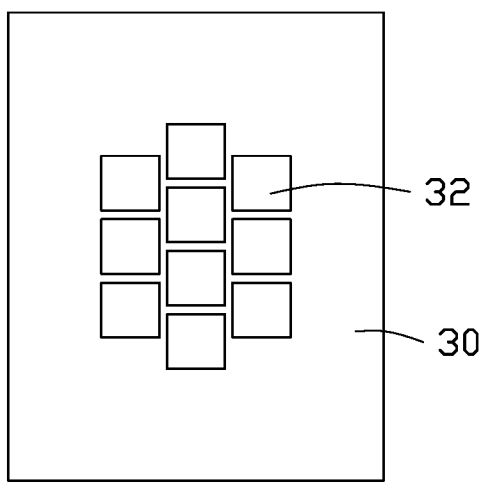

The first surface 12 is depressed to form a receiving groove 120, as shown in FIG. 4-5. The receiving groove 120 includes a light incidence surface 122. The light incidence surface 122 is a free-form surface. The light incidence surface 122 includes an optical axis P-P', and the optical axis P-P' is perpendicular to the first surface 12. The light incidence surface 122 is symmetrical with respect to the optical axis P-P'. In the illustrated embodiment, the light incidence surface 122 is a hemisphere and the optical axis P-P' intersects with the X axis.

The optical lens 10 further includes a first light emitting surface 142. The first light emitting surface 142 protrudes from the second surface 14 of the base 10. The first light emitting surface 142 is a free-form surface. The first light emitting surface 142 includes an optical axis Q-Q'. The optical axis Q-Q' is perpendicular to the first surface 12 and intersects with the first emitting surface 142 at point R. A distance between the point R and the first surface 12 is greater than a distance between the remaining points on the first emitting surface 142 and the first surface 12, such as point I, point J, or point K. The optical axis P-P' of the light incidence surface 122 and the optical axis Q-Q' of the first light emitting surface 142 do not coincide with each other. In this illustrated embodiment, the optical axis P-P' intersects with negative direction of the X axis, and the optical axis Q Q' intersects with positive direction of the X axis.

Figure 3:
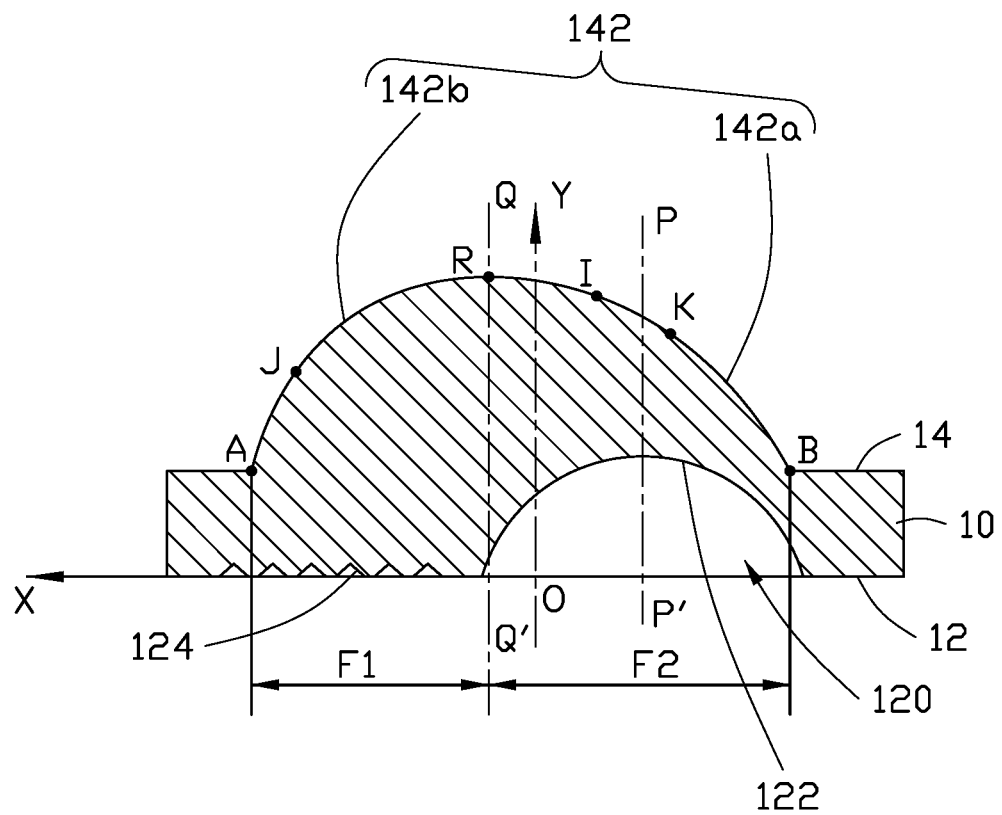
FIG. 3 is a cross-sectional view of the optical lens in FIG. 1 along line III-III.

As shown in FIG. 3, the first light emitting surface 142 includes a first curved surface 142a and a second curved surface 142b connecting with the first curved surface 142a. The first curved surface 142a is located on negative direction of the optical axis Q-Q' towards the X axis, the curved surface AR representing the first part 142a. The second curved surface 142b is located on positive direction of the axis Q-Q' towards the X axis, the curved surface BR representing the second part 142a. The radius of curvature of the first curved surface 142a is greater than the radius of curvature of the second curved surface 142b. A projection length of the first curved surface 142a on the first surface 12 is F1, a projection length of the second curved surface 142b on the first surface 12 is F2, where F1<F2.

The second light emitting surface 124 is arranged beside the receiving groove 120. The second light emitting surface 124 is a micro-structural portion 20 recessed from the first surface 12 towards the second surface 14. The micro-structural portion 20 includes a plurality of miniature single grooves 22 and the plurality of miniature single grooves 22 are arranged in arrays. The miniature grooves 22 are substantially concave conical structures or semicircles. In this embodiment, the groove is concave conical structure, as shown in FIG. 3.

When the optical lens 1 forms a double-sided luminous device 3, a circuit board 30 is provided. The circuit board 30 is a transparent plate and at least one light emitting diode 32 is mounted on the circuit board 30. For example, it can be a transparent ceramic substrate which emits light out from the circuit board 30.

The optical lens 1 is disposed on the circuit board 30 and the at least one light emitting diode 32 faces the light incidence surface 122. In other embodiments, the number of light emitting diodes 32 corresponding to the receiving groove 120 is one or more. Several arrangements of light emitting diodes 32 on a circuit board are provided for FIGS. 6A-6E. In FIGS. 6A-6E, number of light emitting diodes 32 is five, six, seven, nine, and ten. That is, number of the light emitting diodes 32 is based on lighting power required. The number of the corresponding light emitting diodes 32 is selectable to meet the lighting requirements.

Light L emitted from the light emitting diode 32 enters the optical lens 10 via the light incidence surface 122 which includes a first portion light L1 and a second portion light L2. The first portion light L1 indicates light not satisfying total reflection condition when striking the first light emitting surface 142. This portion of light is refracted and emitted out the first light emitting surface 142 to achieve forward illumination, such as the light L11 and L12 shown in FIG. 4.

The second portion light L2 indicates light that satisfies total reflection condition on the first emitting surface 142, such as the light L21 and L22 shown in FIG. 4. This portion of light is reflected by the first light incidence surface 122 and reaches the second light emitting surface 124. The micro-structural section 20 includes a plurality of miniature grooves 22, and when light strikes surfaces of the miniature grooves 22, and satisfies a condition of incident angle being less than critical angle, this portion of light is emitted from a dense medium into a light-thinning medium. Thereby, this portion of light is able to be refracted out of the optical lens 1 to realize the backside illumination of the optical lens 1.

The circuit board 30 is a transparent plate, thereby the second portion light L2 can be emitted out the circuit board 30 Thereby, a device with double sided luminosity, that is device 3, is obtained.

Example 2

Figure 2:
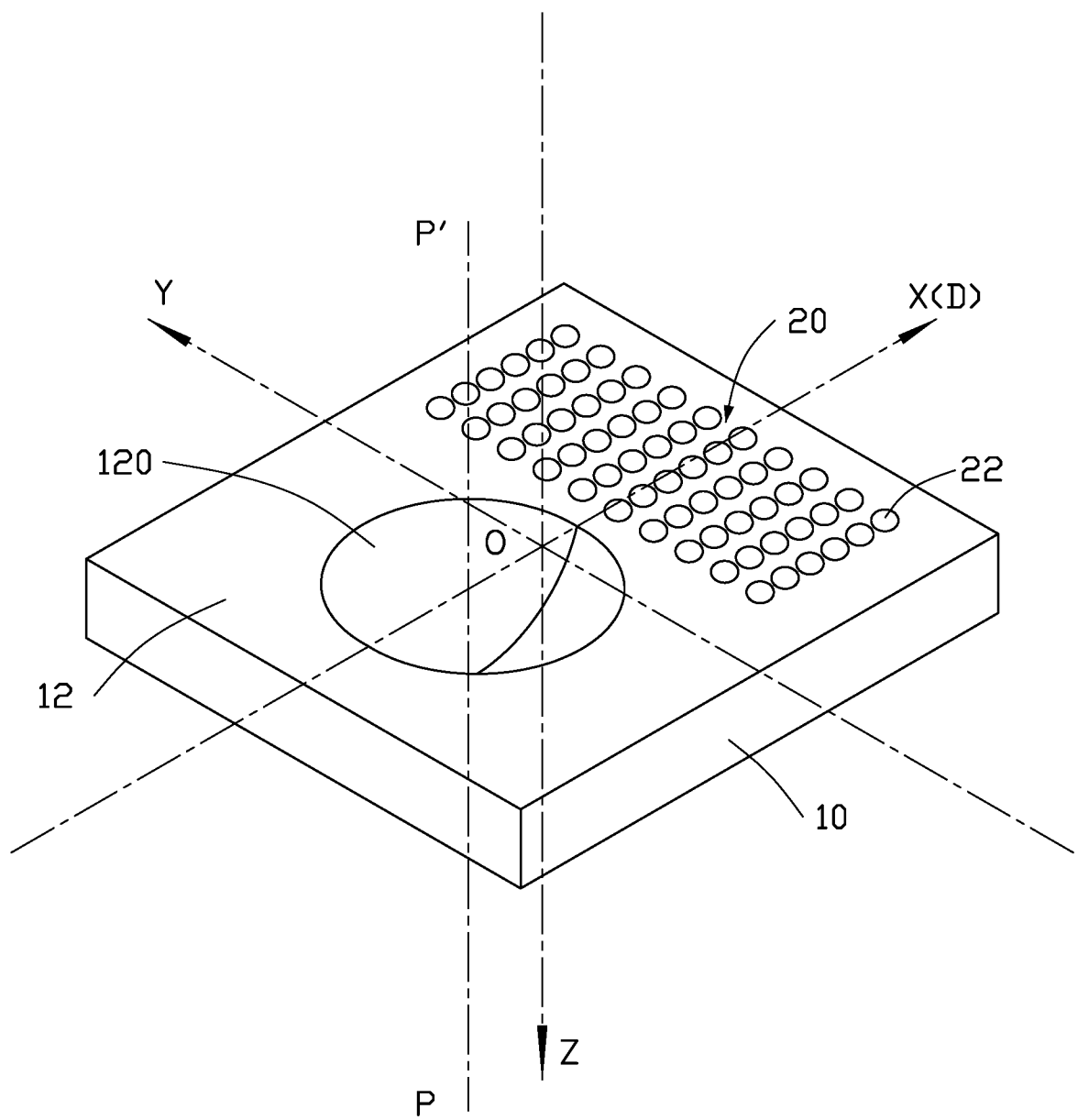
FIG. 2 is another isometric view of the optical lens in FIG. 1.

FIG. 5 illustrates an optical lens 2 according to one embodiment. The optical lens 2 in FIG. 5 is similar to the optical lens 1 in FIG. 2. The difference between the optical lens 5 and the optical lens 2 in FIG. 2 is that the micro-structural portion 20 includes a plurality of long strip grooves 201. The long strip grooves 201 are arranged in parallel, and a cross-section of the long strip grooves 201 can be circular or triangular.

Example 3

Figure 7:
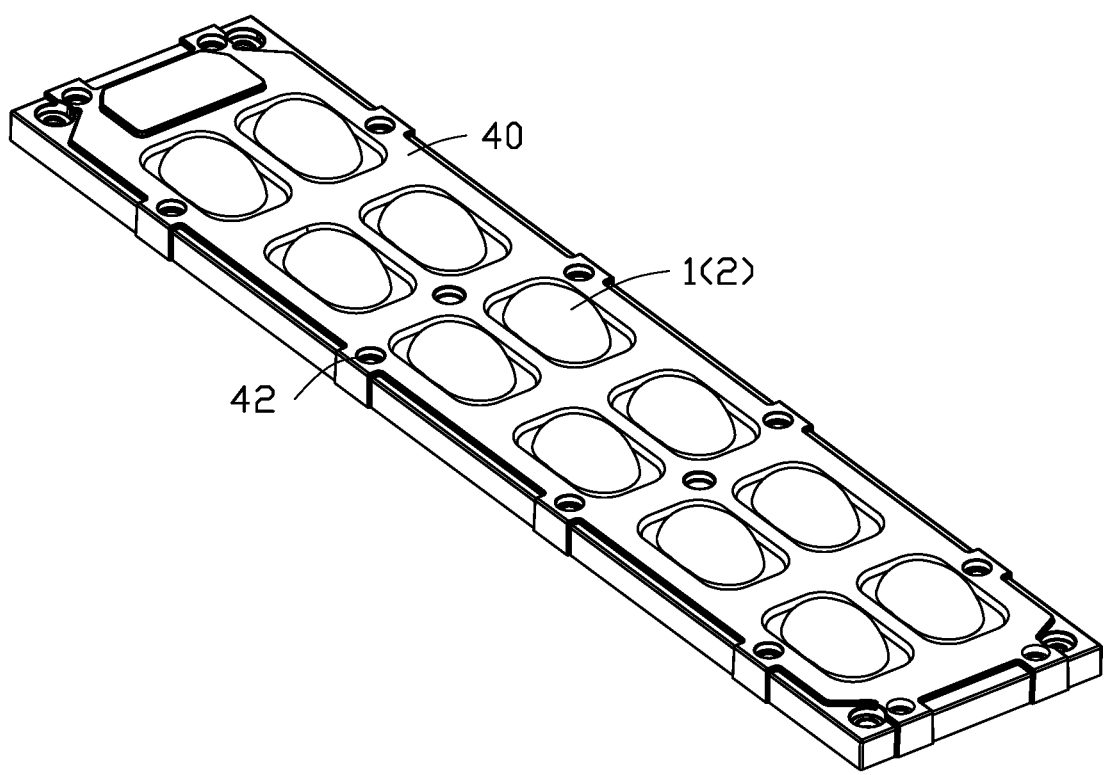
FIG. 7 is another isometric view of a light guide member in accordance with one exemplary embodiment.

FIG. 7 illustrates a light guide member 4 according to one embodiment. The light guide member 4 includes a transparent plate 40 and a plurality of optical lens formed in the transparent plate 40. The transparent plate 40 is made from a plastic material with high transmittance, such as PMMA (polymethyl methacrylate), or PC (polycarbonate), polyimide polyimide (PI), or polyethylene terephthalate (PET). The optical lens 1(2) can be the optical lens 1 shown in FIG. 2 or the optical lens 2 shown in FIG. 5. The transparent plate 40 and the optical lens 1(2) can be integrally formed in a mold, or preformed independently and then assembled together. The transparent plate 40 includes a plurality of fixing holes 42 at edges thereof, the fixing holes 42 are for attaching to a circuit board. The light guide member 4 is configured to form a high-power luminous device.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical lens comprising:
   a base comprising a first surface and a second surface opposite to the first surface, the first surface is depressed to form a receiving groove, the receiving groove comprising a light incidence surface, the light incidence surface defines an optical axis P-P';
   a first light emitting surface protruding from the second surface, the first light emitting surface defines an optical axis Q-Q', the optical axis P-P' and the optical axis Q-Q' not coinciding with each other; and
   a second light emitting surface arranged beside the receiving groove, wherein the second light emitting surface is a micro-structural portion, the micro-structural portion recessing from the first surface to the second surface and forming a plurality of micro-structures, lights incident on the first light emitting surface via the light incidence surface are divided into a first portion light and a second portion light, the first portion light being refracted by the first light emitting surface and emitted out from the first light emitting surface, the second portion light being reflected by the first light emitting surface and entering onto the second light emitting surface, and being refracted by the second light emitting surface and emitted out from the second light emitting surface.

2. The optical lens of claim 1, wherein the light incidence surface is a free-form surface and the optical axis P-P' is perpendicular to the first surface.

3. The optical lens of claim 2, wherein the optical axis Q-Q' is perpendicular to the first surface.

4. The optical lens of claim 3, wherein the optical axis Q-Q' intersects with the first emitting surface at point R, a distance between the point R and the first surface is greater than a distance between the remaining points on the first emitting surface and the first surface.

5. The optical lens of claim 4, wherein the first surface is rectangular and comprises a center point O, and a X axis, a Y axis and a Z axis are defined relative to the first surface, the X axis perpendicular to the Y axis and intersecting with the Y axis at the center point O, the X axis is parallel to a first direction of the first surface, and the Y axis is parallel to a second direction of the first surface, the Z axis passes through the center point O and is perpendicular to the first surface; a direction from the center point O point to the second light emitting surface is a positive direction of the X axis, and a direction of the center point O away from the second light emitting surface is the negative direction of the X axis, the first light emitting surface comprises a first curved surface and a second curved surface connecting with the first curved surface, the first curved surface is located on negative direction of the optical axis Q-Q' towards the X axis, the second curved surface is located on the positive direction of the optical axis Q-Q' towards the X axis.

6. The optical lens of claim 5, wherein the first light emitting surface comprises a first curved surface and a second curved surface connecting with the first curved surface, a radius of curvature of the first curved surface is greater than a radius of curvature of the second curved surface.

7. The optical lens of claim 6, wherein a projection length of the first curved surface on the first surface is F1, a projection length of the second curved surface on the first surface is F2, wherein F1<F2.

8. The optical lens of claim 7, wherein the micro-structures comprises a plurality of single miniature grooves and the plurality of single miniature grooves are arranged in arrays.

9. The optical lens of claim 8, wherein the single miniature grooves are substantially concave conical structure or a semicircle.

10. The optical lens of claim 1, wherein the micro-structures comprises a plurality of long strip grooves, the long strip grooves are arranged in parallel.

11. A double sided luminosity device comprising:
a circuit board being a transparent plate and comprising at least one light emitting diode mounted on the circuit board; and
a base mounted on the circuit board, the base comprising a first surface and a second surface opposite to the first surface, wherein the first surface is depressed to form a receiving groove, the receiving groove is configured to accommodating at the least one light emitting diode and comprises a light incidence surface, the light incidence surface defines an optical axis P-P';
a first light emitting surface protruding from the second surface, wherein the first light emitting surface defines an optical axis Q-Q', the optical axis P-P' and the optical axis Q-Q' do not coincide with each other; and
a second light emitting surface arranged beside the receiving groove, wherein the second light emitting surface is a micro-structural portion, the micro-structural portion is recessed from the first surface to the second surface and forms a plurality of micro-structures, light from the at least one light emitting diode incidents on the first light emitting surface via the light incidence surface is divided into a first portion light and a second portion light, the first portion light being refracted by the first light emitting surface and emitted out from the first light emitting surface, the second portion light being reflected by the first light emitting surface and enter to entering onto the second light emitting surface, and being refracted by the second light emitting surface and emitted out from the circuit board.

12. The double sided luminosity device of claim 11, wherein the micro-structures comprise a plurality of single miniature grooves arranged in arrays.

13. The double sided luminosity device of claim 12, wherein the single miniature grooves are substantially concave conical structure or a semicircle.

14. The double sided luminosity device of claim 11, wherein the micro-structures comprises a plurality of long strip grooves, the long strip grooves are arranged in parallel.

15. The double sided luminosity device of claim 11, wherein the first light emitting surface defines an optical axis Q-Q', and the optical axis Q-Q' is perpendicular to the first surface; the optical axis Q-Q' intersects with the first emitting surface at point R, a distance between the point R and the first surface is greater than a distance between the remaining points on the first emitting surface and the first surface.

16. The double sided luminosity device of claim 15, wherein the first surface is rectangular and comprises a center point O, and a X axis, a Y axis and a Z axis are defined relative to the first surface, the X axis perpendicular to the Y axis and intersecting with the Y axis at the center point O, the X axis is parallel to a first direction of the first surface, and the Y axis is parallel to a second direction of the first surface, the Z axis passes through the center point O and is perpendicular to the first surface; a direction from the center point O point to the second light emitting surface is a positive direction of the X axis, and a direction of the center point O away from the second light emitting surface is a negative direction of the X axis, the first light emitting surface comprises a first curved surface and a second curved surface connecting with the first curved surface, the first curved surface is located on negative direction of the optical axis Q-Q' towards the X axis, the second curved surface is located on positive direction of the axis Q-Q' towards the X axis.

17. The double sided luminosity device of claim 16, wherein the first light emitting surface comprises a first curved surface and a second curved surface connecting with the first curved surface, the curvature of the first curved surface is greater than the curvature of the second curved surface.

18. The double sided luminosity device of claim 17, wherein a projection length of the first curved surface on the first surface is F1, a projection length of the second curved surface on the first surface is F2, and F1<F2.

19. A light guide member comprising:
a transparent plate and a plurality of optical lenses formed in the transparent plate; wherein each optical lens comprises a base, the base comprising a first surface and a second surface opposite to the first surface, the first surface is depressed to form a receiving groove, the receiving groove comprises a light incidence surface, the light incidence surface comprises an optical axis P-P';

a first light emitting surface protruding from the second surface, the first light emitting surface defines an optical axis Q-Q', the optical axis P-P' and the optical axis Q-Q' not coinciding with each other; and a second light emitting surface been arranged beside the receiving groove, wherein the second light emitting surface is a micro-structural portion, the micro-structural portion recessing from the first surface to the second surface and forming a plurality of micro-structures, lights incident on each first light emitting surface via the corresponding light incidence surface being divided into a first portion light and a second portion light, the first portion light being refracted by each first light emitting surface and emitted out from the corresponding first light emitting surface, the second portion light being reflected by each first light emitting surface and entering onto the corresponding second light emitting surface, and being refracted by the corresponding second light emitting surface and emitted out from the transparent plate.

20. The light guide member of claim 19, wherein the transparent plate and the optical lens are integrally formed in a mold.

* * * * *